United States Patent Office 3,124,564
Patented Mar. 10, 1964

3,124,564
PEPTIDE SYNTHESIS WITH ACYLAMINO ACIDS-
ALKYL AND ARENE SULFONIC ACID MIXED
ANHYDRIDES
Frank C. McKay, Schodack, N.Y., assignor to Sterling
Drug Inc., New York, N.Y., a corporation of Delaware
No Drawing. Filed Jan. 11, 1961, Ser. No. 81,945
13 Claims. (Cl. 260—112)

This invention relates to a novel method for forming a peptide linkage and to products useful as starting materials in said method and their preparation.

A number of methods for forming peptide linkages is known in the prior art, including use, for example, of mixed anhydrides of aminoacids with phosphorus acid diesters, with carboxylic acids, and with sulfuric acid, but all of the available methods have some disadvantages which prevent their being completely satisfactory in all instances. It is therefore highly desirable to have a new method for forming a peptide linkage both for general application and for use in special circumstances where the drawbacks of the previously available methods need to be overcome.

Accordingly, it is a primary object of the present invention to provide a new method of general applicability for forming a peptide linkage and which method is also useful in the synthesis of peptides which are ordinarily difficult to prepare. It is a further object of my invention to provide a method for preparing optically active peptides from optically active starting materials while substantially avoiding racemization.

My new method for forming a peptide linkage comprises reacting an aminoacid having an acylatable amino group with a mixed anhydride of an aminoacid devoid of unmasked amino groups and an organic sulfonic acid in the presence of a tertiary organic nitrogen base. The reaction proceeds in accordance with the following equation:

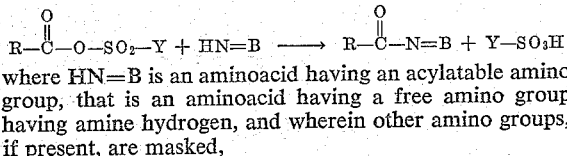

where HN=B is an aminoacid having an acylatable amino group, that is an aminoacid having a free amino group having amine hydrogen, and wherein other amino groups, if present, are masked,

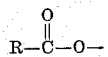

is an organic radical derived from an aminoacid having its amino group or groups blocked by acylation, and Y is an organic radical.

The amine portion, HN=B, is an aminoacid having an acylatable amino group and hence is able to furnish the amino group for the above reaction. Aminoacids having multiple amino groups must of course have all the amino groups other than the one being acylated blocked or masked by the conventional protective groups. The amine portion can be, for example, any of the naturally occurring amino acids, as for instance, glycine, alanine, valine, norvaline, leucine, isoleucine, phenylalanine, tyrosine, serine, cystine, methionine, aspartic acid, glutamic acid, lysine, orinthine, asparagine, citrulline, histidine, tryptophan, proline and hydroxyproline. Moreover, the amine portion can be any dipeptide, as for example, glycylalanine, or a tripeptide, as for example, tryptophanylleucylvaline or a higher polypeptide.

The radical

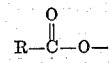

as indicated above is a group derived from an aminoacid and hence R is an organic radical attached to the carbonyl group by a carbon to carbon linkage and having an acylamino substituent preferably but not necessarily in the alpha or beta position. For example, when the group

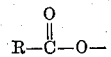

is derived from an alpha-aminoacid, the mixed anhydride can be represented by the formula

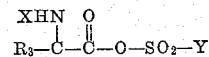

wherein Y is as defined above, X is an acyl group suitable for protection of an amino group, and R is hydrogen or the residue of an aminoacid devoid of unmasked amino groups. In many instances the acyl group can be derived from an aminoacid or peptide and hence the method of the invention will result in the formation of higher peptide derivatives.

The preparation of the mixed anhydride of an aminoacid devoid of unmasked amino groups, that is, an acid derived from an aminoacid by blocking the amino group or groups by acylation, is carried out by reacting any salt of the free carboxylic group of an aminoacid, having the amino group or groups blocked by acylation, with an organic sulfonyl chloride. The reaction proceeds in accordance with the following equation:

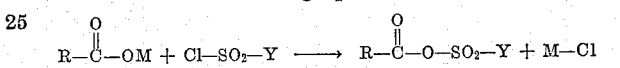

where M is a cation, such as tri-substituted ammonium, heavy metal or alkali metal. The nature of the cation M is not critical. Also, the nature of the sulfonyl chloride, Y—$SO_2$—Cl, is not critical, and Y can be any organic radical present in conventional sulfonyl chlorides. The organic radical Y and the cation M are of course split off in practicing my method for forming a peptide linkage, and hence they act in effect merely as carriers. The sulfonyl halide is usually selected in accordance with a preferred group wherein Y is an arene or lower-alkane radical. Thus, I usually like to use benzenesulfonyl chloride, p-toluenesulfonyl chloride or methanesulfonyl chloride since these compounds are cheap and readily available and give good yields in the practice of my invention. This reaction is preferably carried out at 0° C., but temperatures in the range of −20° up to about 100° C. can be employed as desired. The reaction time required is usually about three to thirty minutes. Advantageously, the reaction is carried out either in an inert solvent of the type employed in the process described hereinafter for the formation of a peptide linkage or in a tertiary organic nitrogen base. In the latter case it is preferred to use tri-lower-alkylamines, as for example, trimethyl and triethylamine and heteroaromatic amines, as for example pyridine.

In a preferred procedure for preparing the mixed anhydride, the aminoacid reactant devoid of unmasked amino groups is first converted to an organic or inorganic salt. Amine salts of the aminoacids, for example salts with tertiary amines such as tri-lower-alkylamines, for example triethylamine, tributylamine, and the like, are especially well adapted to use in this manner because of the ease of their preparation and since these amine salts are relatively soluble in the solvents usually employed.

The mixed anhydrides produced by the process described above are in general crystalline solids or syrups which can usually be crystallized by trituration with inert hydrocarbons, ethers or esters. The melting points are uncharacteristic and not sharp due to the disproportionation which occurs on fusion.

As indicated above, the mixed anhydrides useful as starting materials in my process for making peptides have the general structural formula

where R and Y are as defined above. The radical Y is preferably an arene or a lower-alkane radical and hence when Y is an arene radical it is an aromatic hydrocarbon radical such as phenyl, o-, m-, and p-tolyl, o-, m-, and p-xylyl, 1-naphthyl, 2-naphthyl, 1-methyl-2-naphthyl, biphenyl, etc. or such an aromatic hydrocarbon radical substituted by inert groupings such as halogen, alkoxy, and nitro. When Y is a lower alkane radical I generally prefer methyl or ethyl but other lower-alkane radicals such as propyl, butyl, isobutyl and the like can be used.

The amine-masked aminoacid suitable for use in the preparation of the mixed anhydride can be any aminoacid wherein the amino group or groups is blocked in conventional fashion as by acylation, to prevent zwitter-ion formation during preparation of the desired mixed anhydride. Thus, the amine-masked aminoacid can be, for example the N-alkanoyl, N-benzoyl, N-phthaloyl, or N-carbenzoxy derivative of any of the naturally occurring amino acids, as for instance alanine, valine, norvaline, leucine, isoleucine, phenylalanine, hyrosine, serine, cystine, methionine, aspartic acid, glutamic acid, lysine, ornithine, asparagine, citrulline, histidine, tryptophan, proline and hydroxypropline or of any dipeptides, tripeptides and polypeptides.

My new method for forming a peptide linkage is preferably performed in an inert solvent. Suitable inert solvents include aromatic hydrocarbons such as benzene, toluene, xylene, etc.; aliphatic hydrocarbons such as hexane, heptane, octane etc.; chlorinated hydrocarbons such as chloroform, carbon tetrachloride, methylene dichloride, chlorobenzene etc.; aliphatic ketones such as acetone, methyl ethyl ketone, dibutyl ketone etc.; aliphatic ethers such as diethyl ether, dibutyl ether, etc.; cyclic ethers such as dioxane, tetrahydrofuran, etc.; and esters such as ethyl acetate, etc. Although the reactions will proceed in the presence of water or alcohols, the yields are materially decreased and therefore the use of anhydrous solvents is desirable.

The reaction can be conveniently carried out at room temperature, that is, about 25° C., by stirring the reaction mixture for one or more hours. Alternatively, the reaction mixture can be heated if it is desired to carry out the reaction more quickly; for example at 65° C. the acylation reaction is usually complete in about five minutes.

The method for forming the peptide linkage is performed in the presence of a tertiary organic nitrogen base, as for example triethylamine, tributylamine and pyridine. Alternatively, an additional equivalent of the aminoacid having an acylatable amino group and undergoing the reaction with the mixed anhydride could be used. However, this is often impractical because of the complexity and cost of the particular aminoacid involved.

There is considerable advantage both in yield of product and operational convenience, in forming the peptide linkage without isolating the intermediate mixed anhydride. This method is carried out by interacting the sulfonyl chloride Y—SO₂—Cl, and an aminoacid devoid of unmasked amino groups,

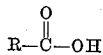

or salt thereof in the presence of a tertiary organic nitrogene base, adding an aminoacid directly to the reaction mixture, and stirring the mixture for one or more hours. As was indicated above, it is preferred to use an amine salt of the aminoacid when preparing the mixed anhydride. In order to obtain maximum yields of the peptides an additional molecular equivalent of the base is employed. This second mole of base then reacts with the sulfonic acid liberated in the formation of the peptide linkage.

From the above discussion it is seen that the method of the invention provides a means by which it is possible to prepare long chain polypeptides. The polypeptides can be built one molecule at a time by reacting an aminoacid with a sulfonyl chloride to form the mixed anhydride and reacting the product with a simple aminoacid and so on. Polypeptides can also be synthesized several molecules at a time by preparing, for example, a tripeptide anhydride and reacting this with a dipeptide, tripeptide etc., anhydride.

The following examples will further illustrate the invention, without the same being limited thereto.

EXAMPLE 1

*Methyl carbobenzoxy-L-Leucyl-L-Leucinate*

A solution of 25 g. of carbobenzoxy-L-leucine and 13.2 ml. of triethylamine in 200 ml. of acetone was cooled to −10° C. and treated with 7.2 ml. of methanesulfonyl chloride. The mixture was stirred for four minutes at −10° C. to produce a solution of the mixed anhydride of carbobenzoxy-L-leucine and methanesulfonic acid having the formula

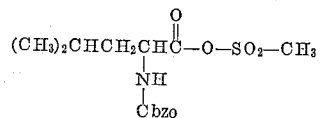

where here and in what follows Cbzo means

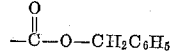

To the solution of the mixed anhydride at −10° C. was added 17.2 g. of methyl L-leucinate hydrochloride and 26.4 ml. of triethylamine in 75 ml. of chloroform and the mixture allowed to warm to room temperature. Stirring was continued for two hours after which the mixture was filtered, the solvent removed by distillation and the residue taken up in ethyl acetate. The ethyl acetate solution was washed successively with dilute hydrochloric acid, water, sodium bicarbonate and again with water. The ethyl acetate extract was dried over anhydrous calcium sulfate, i.e., "Drierite," and concentrated to give a syrupy product which crystallized when cooled to room temperature. Recrystallization from n-hexane gave 26.8 g. (73%) of methyl carbobenzoxy-L-leucyl-L-leucinate, melting point 73–81° C.

*Analysis.*—Calcd. for C₂₁H₃₂N₂O₅: N, 7.13. Found: N, 7.07. [α]$_D^{25}$=−35.8°±0.2° (1% in alcohol).

EXAMPLE 2

*Methyl Carbobenzoxy-DL-Methionylglycinate*

A solution of 14.2 g. of carbobenzoxy-DL-methionine and 7.0 ml. of triethylamine in 120 ml. of acetone was cooled to −10° C. and treated with 3.8 ml. of methanesulfonyl chloride. The mixture was stirred at −10° C. for three minutes and there was thus produced a solution of the mixed anhydride of carbobenzoxy-DL-methionine and methane sulfonic acid having the formula

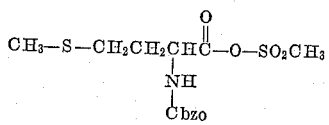

To a solution of the mixed anhydride at −10° C. was added a solution of 6.3 g. of methyl glycinate hydrochloride and 14.0 ml. of triethylamine in 50 ml. of chloroform. The mixture was allowed to warm to room temperature, then stirred for two hours. Following the procedure described in Example 1 there was obtained 10.1 g. of carbobenzoxy-DL-methionylglycinate, having the melting point 84–86° C.

*Analysis.*—Calcd. for C₁₆H₂₂N₂O₅S: N, 7.91. Found: N, 7.98.

This product was prepared in 71% yield when 9.5 g. of p-toluenesulfonyl chloride was substituted for the 3.8 ml. of methanesulfonyl chloride and the reaction was carried out at 5° C.

EXAMPLE 3

*Methyl Carbobenzoxy-DL-Valylglycinate*

A solution of the mixed anhydride of carbobenzoxy-DL-valine and methanesulfonyl chloride having the formula

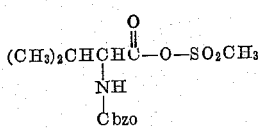

was prepared from 12.5 g. of carbobenzoxy-DL-valine, 7.0 ml. of triethylamine and 3.8 ml. of methanesulfonyl chloride in 120 ml. of acetone according to the procedure described in Example 1. The solution of the mixed anhydride was treated with a solution of 6.3 g. of methyl glycinate hydrochloride and 14 ml. of triethylamine in 50 ml. of chloroform and stirred for two hours. The product was isolated according to the procedure described in Example 1. After recrystallization from ethyl acetate there was obtained 7.3 g. (46%) of methyl carbobenzoxy-DL-valylglycinate, melting point 128–131° C.

*Analysis.*—Calcd. for $C_{16}H_{22}N_2O_5$: N, 8.69. Found: N, 8.57.

EXAMPLE 4

*Carbobenzoxy-β-Alanyl-DL-Phenylalaninate*

A solution of 11.2 g. of carbobenzoxy-β-alanine and 7.0 ml. of triethylamine in 120 ml. of acetone was treated with 3.8 ml. of methanesulfonyl chloride at −10° C. There was thus produced a solution of the mixed anhydride of carbobenzoxy-β-alanine and methanesulfonic acid having the formula

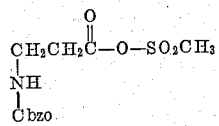

To a solution of the mixed anhydride at −10° C. was added a solution of 10.8 g. of methyl DL-phenylalaninate and 14.0 ml. of triethylamine in 50 ml. of chloroform. The reaction was completed and the product isolated by the procedure described in Example 1. The carbobenzoxy-β-alanyl-DL-phenylalaninate thus obtained weighed 17.1 g.

*Analysis.*—Calcd. for $C_{21}H_{24}N_2O_5$: N, 7.28. Found: N, 7.28.

This product was also prepared from the mixed anhydride of carbobenzoxy-β-alanine and butanesulfonic acid having the formula

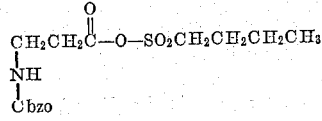

by reaction with methyl-DL-phenylalaninate.

EXAMPLE 5

*Methyl Carbobenzoxy-DL-Tryptophyl-β-Alaninate*

To a solution of 16.9 g. of carbobenzoxy-DL-tryptophan and 7.0 ml. of triethylamine in 120 ml. of acetone at −15° C. was added 3.8 ml. of methanesulfonyl chloride and stirring continued for three minutes. There was thus produced a solution of the mixed anhydride of carbobenzoxy-DL-tryptophan and methanesulfonic acid having the formula

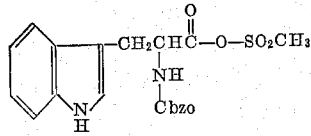

To a solution of the mixed anhydride was added a solution of 7.0 g. of methyl β-alaninate hydrochloride and 14.0 ml. of triethylamine in 50 ml. of chloroform. The mixture was stirred for two hours and then worked up according to the procedure described in Example 1. After recrystallization from ethanol there was obtained 15.4 g. of methyl carbobenzoxy-DL-tryptophyl-β-alaninate, melting point 103–106° C.

*Analysis.*—Calcd. for $C_{23}H_{25}N_3O_5$: N, 9.92. Found: N, 10.02.

EXAMPLE 6

*Benzyl α,ε-Dicarbobenzoxy-L-Lysyl-L-Leucinate*

To a solution of 10.7 g. of α,ε-dicarbobenzoxy-L-lysine and 3.5 ml. of triethylamine in 75 ml. of acetone, cooled to −10° C. was added 4.8 g. of p-toluenesulfonyl chloride and the mixture stirred for twenty minutes. There was thus produced a solution of the mixed anhydride of α,ε-dicarbobenzoxy-L-lysine and p-toluenesulfonic acid having the formula

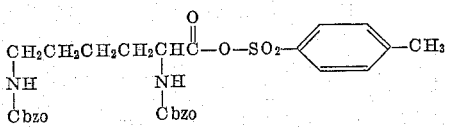

To the solution of the mixed anhydride at −10° C. was added a solution of 7.6 g. of benzyl L-leucinate hydrobromide and 7.0 ml. of triethylamine in 50 ml. of chloroform. The reaction was completed and the product isolated by the procedure described in Example 1. There was thus obtained 9.0 g. of benzyl α,ε-dicarbobenzoxy-L-lysyl-L-leucinate, melting point 109–111° C.

*Analysis.*—Calcd. for $C_{35}H_{43}N_3O_7$: N, 6.80. Found: N, 6.91.

EXAMPLE 7

*Methyl Carbobenzoxy-β-Alanylglycinate*

To a solution of 11.7 g. of carbobenzoxy-β-alanine and 7.0 ml. of triethylamine in 120 ml. of acetone, cooled to −10° C. was added 3.8 ml. of methanesulfonyl chloride and the mixture stirred for twenty minutes. There was thus produced a solution of the mixed anhydride of carbobenzoxy-β-alanine and methanesulfonic acid having the formula

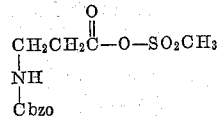

To the solution of the mixed anhydride at −10° C. was added a solution of 6.3 g. of methyl glycinate hydrochloride and 14 ml. of triethylamine in 40 ml. of chloroform. The reaction was completed and the product isolated as described in Example 1. The 9.0 g. of methyl carbobenzoxy-β-alanylglycinate thus obtained had the melting point 72–76° C.

*Analysis.*—Calcd. for $C_{15}H_{20}N_2O_5$: N, 9.08. Found: N, 9.08.

EXAMPLE 8

*Phthaloyl-DL-Valine Amide*

To a solution of 49.4 g. of phthaloyl-DL-valine and 28 ml. of triethylamine in 300 ml. of acetone, cooled to −10° C. was added 15.2 ml. of methanesulfonyl chloride and the mixture stirred for five minutes. There was thus produced the mixed anhydride of phthaloyl-DL-valine and methanesulfonic acid having the formula

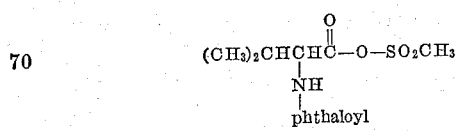

To the solution of the mixed anhydride at −10° C. was added 30 ml. of concentrated ammonium hydroxide and stirring continued for two hours at room temperature. The solid thus obtained was removed by suction filtration, washed thoroughly with water and dried. The filtrate was concentrated by distillation to give a solid product which was removed by filtration, washed with water and dried. The two solid products were combined and recrystallized from alcohol. The 30 g. of phthaloyl-DL-valine amide thus obtained had the melting point 175–176° C.

*Analysis.*—Calcd. for $C_{13}H_{14}N_2O_3$: N, 11.38. Found: N, 11.25.

EXAMPLE 9

Methyl Carbobenzoxy-DL-Valyl-β-Alaninate

To a solution of 12.6 g. of carbobenzoxy-DL-valine and 7.0 ml. of triethylamine in 120 ml. of acetone, cooled to 5° C., was added 9.5 g. of p-toluenesulfonyl chloride and the mixture stirred for twenty minutes. There was thus produced a solution of the mixed anhydride of carbobenzoxy-DL-valine and p-toluenesulfonic acid having the formula

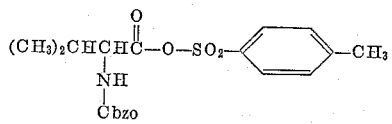

To the solution of the mixed anhydride, cooled to 5° C. was added a solution of 7.0 g. of methyl β-alaninate and 14.0 ml. of triethylamine in 50 ml. of chloroform. The reaction was completed and the product isolated by the procedure described in Example 1. There was thus obtained 9 g. of methyl carbobenzoxy-DL-valyl-β-alaninate, melting point 105–108° C.

*Analysis.*—Calcd. for $C_{17}H_{24}N_2O_5$: N, 8.32. Found: N, 8.17.

EXAMPLE 10

Ethyl Carbobenzoxyglycyl-L-Leucyl-D-Tryptophanate

To a solution of 8.1 g. of carbobenzoxyglycyl-L-leucine and 7 ml. of triethylamine in 70 ml. of toluene, cooled to 0° C., was added 4.8 g. of p-toluenesulfonyl chloride and the mixture stirred for thirty minutes. There was thus produced the mixed anhydride of carbobenzoxyglycyl-L-leucine and p-toluenesulfonic acid having the formula

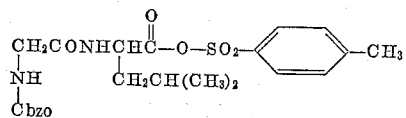

To the solution of the mixed anhydride was added a solution of 6.6 g. of ethyl D-tryptophanate in 40 ml. of warm toluene. The mixture was heated rapidly to 65° C. and kept at this temperature for five minutes then cooled. The product was isolated according to the procedure described in Example 1. The ethyl carbobenzoxyglycyl-L-leucyl-D-tryptophanate thus obtained weighed 7.1 g. and had the melting point 127–130° C.

*Analysis.*—Calcd. for $C_{29}H_{36}N_4O_6$: N, 10.44. Found: N, 10.44.

Ethyl carbobenzoxyglycyl-L-leucyl-D-tryptophanate can also be prepared by reacting ethyl L-leucyltryptophanate with the mixed anhydride of carbobenzoxyglycine and p-toluenesulfonic acid. In similar fashion other peptides having the same amino-acids arranged in a different sequence can be prepared. Thus for example ethyl carbobenzoxyglycyl-D-tryptophanyl-L-leucinate can be prepared by reacting ethyl L-leucinate with the mixed anhydride or carbobenzoxyglycyl-D-tryptophan or ethyl carbobenzoxy L-leucyl-D-tryptophanylglycinate can be prepared by reacting ethyl glycinate with the mixed anhydride of carbobenzoxy L-leucyl-D-tryptophan.

This application is a continuation-in-part of my prior copending applications, Serial No. 562,027, filed January 30, 1956, and Serial No. 9206, filed February 17, 1960.

I claim:

1. In a method for forming a peptide linkage, the step which comprises reacting an aminoacid having one amino group capable of being acylated with a mixed anhydride of an N-acylated aminoacid and an organic sulfonic acid selected from the group consisting of lower-alkane and arene sulfonic acids in the presence of a tertiary organic nitrogen base selected from the ground consisting of tri-lower-alkylamine and pyridine.

2. In a method for forming a peptide linkage, the step which comprises reacting an aminoacid having one amino group capable of being acylated with a mixed anhydride of an N-acylated aminoacid and an arene sulfonic acid in the presence of a tri-lower-alkylamine.

3. In a method for forming a peptide linkage, the step which comprises reacting an aminoacid having one amino group capable of being acylated with a mixed anhydride of an N-acylated aminoacid and a lower-alkane sulfonic acid in the presence of a tri-lower-alkylamine.

4. The mixed anhydride of an aminoacid devoid of unmasked amino groups and an organic sulfonic acid.

5. The mixed anhydride of an aminoacid devoid of unmasked amino groups and an arene sulfonic acid.

6. The mixed anhydride of an aminoacid devoid of unmasked amino groups and a lower-alkane sulfonic acid.

7. The mixed anhydride of carbobenzoxyglycine and p-toluenesulfonic acid.

8. The mixed anhydride of carbobenzoxy-DL-methionine and methanesulfonic acid.

9. The mixed anhydride of carbobenzoxy-DL-tryptophan and methanesulfonic acid.

10. The mixed anhydride of α,ε-dicarbobenzoxy-L-lysine and p-toluenesulfonic acid.

11. The process for preparing a mixed anhydride of an N-acylated aminoacid and an organic sulfonic acid which comprises reacting a salt of an N-acylated aminoacid with an organic sulfonyl chloride selected from the group consisting of lower-alkane and arene sulfonyl chlorides.

12. The process for preparing a mixed anhydride of an N-acylated aminoacid and an arene sulfonic acid which comprises reacting a tri-lower-alkylamine salt of the N-acylated aminoacid with an arene sulfonyl chloride.

13. The process for preparing a mixed anhydride of an N-acylated aminoacid and a lower-alkane sulfonic acid which comprises reacting a tri-lower-alkylamine salt of the N-acylated aminoacid with a lower-alkane sulfonyl chloride.

References Cited in the file of this patent

UNITED STATES PATENTS

| | | |
|---|---|---|
| 2,628,253 | Dowdall | Feb. 10, 1953 |
| 2,903,481 | Murata | Sept. 8, 1959 |
| 2,948,714 | Amiard et al. | Aug. 9, 1960 |
| 2,978,444 | Schwyzer et al. | Apr. 4, 1961 |
| 3,053,825 | Kaiser et al. | Sept. 11, 1962 |

OTHER REFERENCES

Clayton: J. Chem. Soc., pages 1398–1412 (1957).
Kenner: J. Chem. Soc., pages 2069–2076 (1952).
Fieser et al.: Organic Chemistry, 2nd edition, pages 626–629 (1950).

UNITED STATES PATENT OFFICE
CERTIFICATE OF CORRECTION

Patent No. 3,124,564                  March 10, 1964

Frank C. McKay

It is hereby certified that error appears in the above numbered patent requiring correction and that the said Letters Patent should read as corrected below.

Column 1, line 60, for "orinthine" read -- ornithine --; column 3, lines 5 and 6, for "biphenyl" read -- biphenylyl --; line 20, for "hyrosine" read -- tyrosine --; same column 3, lines 22 and 23, for "hydroxypropline" read -- hydroxyproline -- column 4, line 62, and column 5, lines 40 and 75, for "To a solution", each occurrence, read -- To the solution --; column 8, line 15, for "ground" read -- group --.

Signed and sealed this 11th day of August 1964.

(SEAL)
Attest:

ERNEST W. SWIDER
Attesting Officer

EDWARD J. BRENNER
Commissioner of Patents